(12) United States Patent
Huang et al.

(10) Patent No.: US 7,133,826 B2
(45) Date of Patent: Nov. 7, 2006

(54) METHOD AND APPARATUS USING SPECTRAL ADDITION FOR SPEAKER RECOGNITION

(75) Inventors: Xuedong Huang, Woodinville, WA (US); Michael D. Plumpe, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/065,573

(22) Filed: Feb. 24, 2005

(65) Prior Publication Data

US 2005/0143997 A1    Jun. 30, 2005

Related U.S. Application Data

(62) Division of application No. 09/685,534, filed on Oct. 10, 2000.

(51) Int. Cl.
*G10L 15/08* (2006.01)

(52) U.S. Cl. .................. 704/240; 704/233; 704/226

(58) Field of Classification Search .............. 704/240, 704/226, 233
See application file for complete search history.

(56) References Cited

U.S. PATENT DOCUMENTS 4,933,973 A * 6/1990 Porter .................. 704/233
5,930,749 A * 7/1999 Maes .................. 704/228
6,026,359 A   2/2000 Yamaguchi et al. ..... 704/256.4
6,263,216 B1 * 7/2001 Seydoux et al. ............ 455/564
6,445,801 B1   9/2002 Pastor et al. ............... 381/94.2
6,449,594 B1 * 9/2002 Hwang et al. .............. 704/233
6,577,997 B1 * 6/2003 Gong ......................... 704/252
6,671,666 B1   12/2003 Ponting et al. ............. 704/233

OTHER PUBLICATIONS

U.S. Appl. No. 09/685,534, filed Oct. 10, 2000 and Office Action: Sep. 22, 2004; and Response: Nov. 23, 2004.

* cited by examiner

*Primary Examiner*—Richemond Dorvil
*Assistant Examiner*—Qi Han
(74) *Attorney, Agent, or Firm*—Theodore M. Magee; Westman, Champlin & Kelly, P.A.

(57) ABSTRACT

A method and apparatus for speaker recognition is provided that matches the noise in training data to noise in testing data using spectral addition. Under spectral addition, the mean and variance for a plurality of frequency components are adjusted in the training data and the test data so that each mean and variance is matched in a resulting matched training signal and matched test signal. The adjustments made to the training data and test data add to the mean and variance of the training data and test data instead of subtracting from the mean and variance.

9 Claims, 11 Drawing Sheets

METHOD AND APPARATUS USING SPECTRAL ADDITION FOR SPEAKER RECOGNITION

This application is a divisional of and claims priority from U.S. patent application Ser. No. 09/685,534 filed on Oct. 10, 2000.

BACKGROUND OF THE INVENTION

The present invention relates to speaker recognition. In particular, the present invention relates to training and using models for speaker recognition.

A speaker recognition system identifies a person from their speech. Such systems can be used to control access to areas or computer systems as well as tailoring computer settings for a particular person.

In many speaker recognition systems, the system asks the user to repeat a phrase that will be used for recognition. The speech signal that is generated while the user is repeating the phrase is then used to train a model. When a user later wants to be identified by their speech, they repeat the identification phrase. The resulting speech signal, sometimes referred to as a test signal, is then applied against the model to generate a probability that the test signal was generated by the same person who produced the training signals.

The generated probability can then be compared to other probabilities that are generated by applying the test signal to other models. The model that produces the highest probability is then considered to have been produced by the same speaker who generated the test signal. In other systems, the probability is compared to a threshold probability to determine if the probability is sufficiently high to identify the person as the same person who trained the model. Another type of system would compare the probability to the probability of a general model designed to represent all speakers.

The performance of speaker recognition systems is affected by the amount and type of background noise in the test and training signals. In particular, the performance of these systems is negatively impacted when the background noise in the training signal is different from the background noise in the test signal. This is referred to as having mismatched signals, which generally provides lower accuracy than having so-called matched training and testing signals.

To overcome this problem, the prior art has attempted to match the noise in the training signal to the noise in the testing signal. Under some systems, this is done using a technique known as spectral subtraction. In spectral subtraction, the systems attempt to remove as much noise as possible from both the training signal and the test signal. To remove the noise from the training signal, the systems first collect noise samples during pauses in the speech found in the training signal. From these samples, the mean of each frequency component of the noise is determined. Each frequency mean is then subtracted from the remaining training speech signal. A similar procedure is followed for the test signal, by determining the mean strength of the frequency components of the noise in the test signal.

Spectral subtraction is less than ideal as a noise matching technique. First, spectral subtraction does not remove all noise from the signals. As such, some noise remains mismatched. In addition, because spectral subtraction performs a subtraction, it is possible for it to generate a training signal or a test signal that has a negative strength for a particular frequency. To avoid this, many spectral subtraction techniques abandon the subtraction when the subtraction will result in negative strength, using a flooring technique instead. In those cases, the spectral subtraction technique is replaced with a technique of attenuating the particular frequency.

For these reasons, a new noise matching technique for speaker recognition is needed.

SUMMARY OF THE INVENTION

A method and apparatus for speaker recognition is provided that matches the noise in training data to the noise in testing data using spectral addition. Under spectral addition, the mean and variance for a plurality of frequency components are adjusted in the training data and the test data so that each mean and variance is matched in a resulting matched training signal and matched test signal. The adjustments made to the training data and test data add to the mean and variance of the training data and test data instead of subtracting from the mean and variance.

DETAILED DESCRIPTION OF ILLUSTRATIVE EMBODIMENTS

Figure 1:
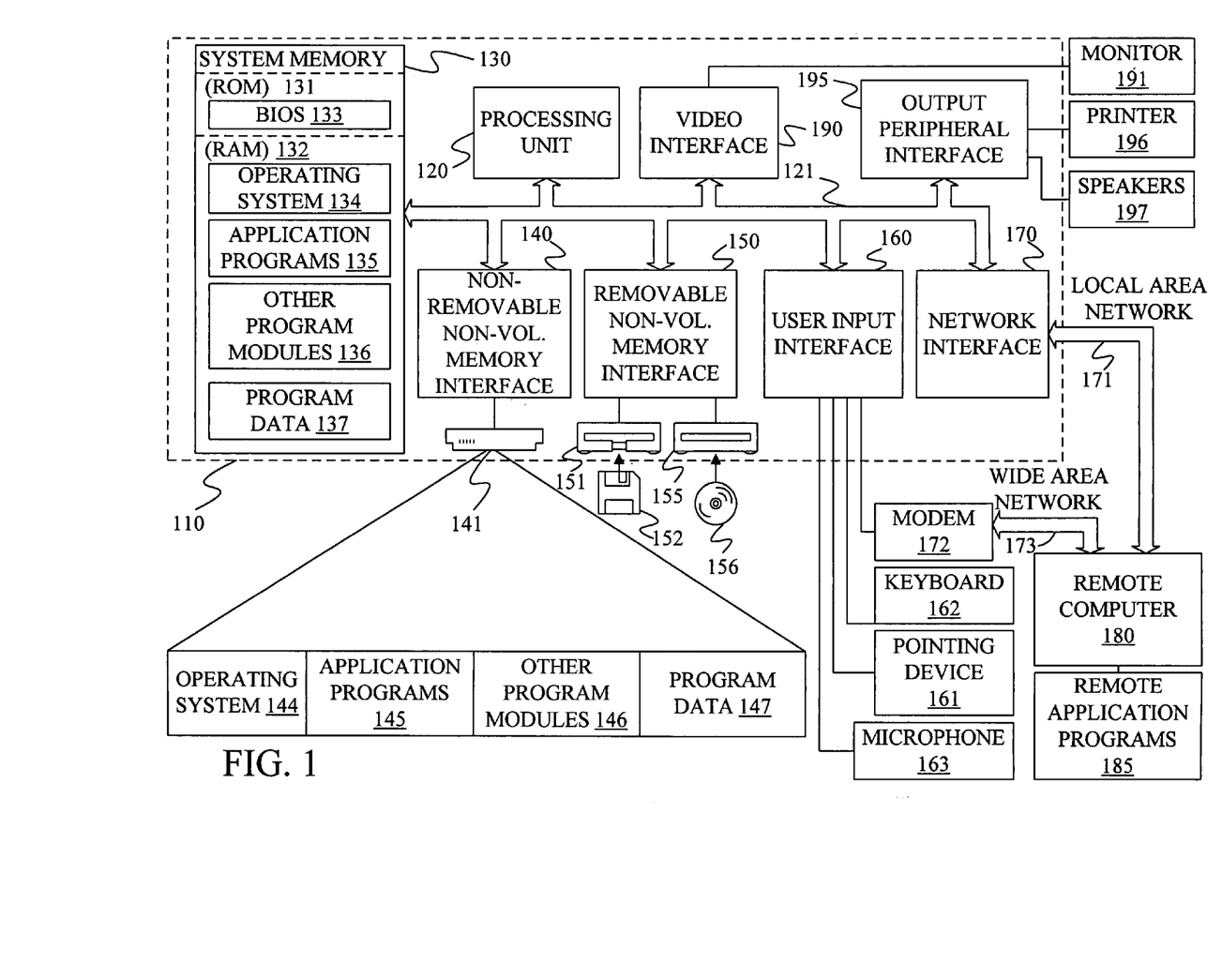
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, mircoprocessor-based systems, set top boxes, programmable consumer electronics, network PCs, minicomputers, mainframe computers, distributed computing environments that include any of the above systems or devices, and the like. In addition, the invention may be used in a telephony system.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
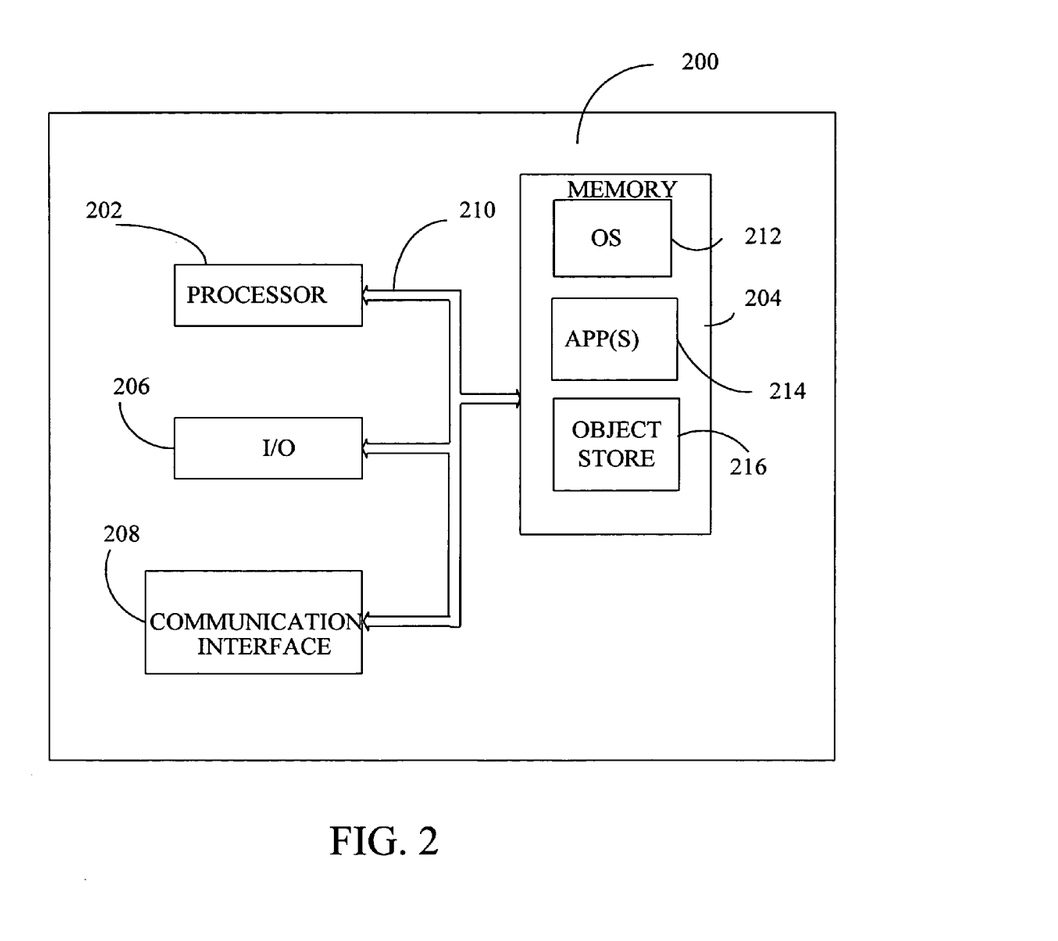
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
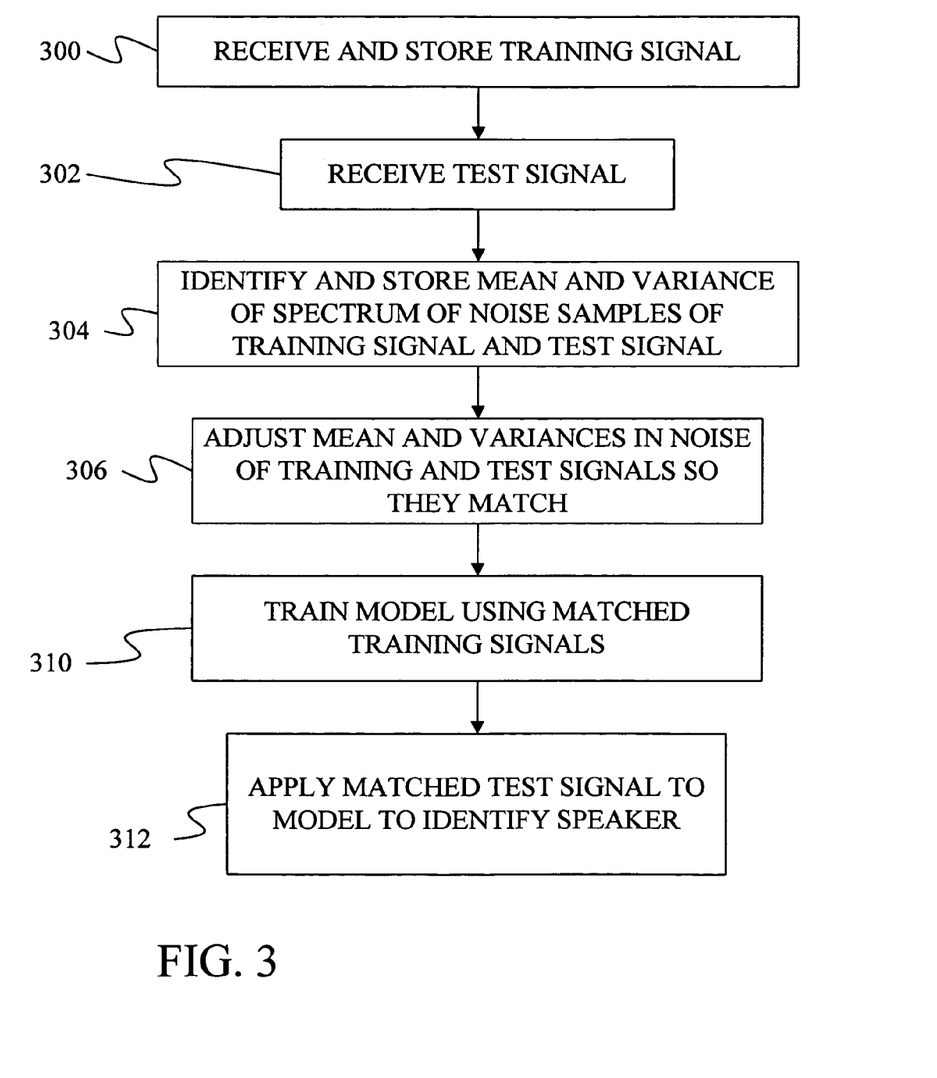
FIG. 3 is a flow diagram of one embodiment of a method of speaker recognition under the present invention.

Under the present invention, an apparatus and method are provided that improve the matching of noise between training data and test data. FIG. 3 shows one embodiment of a method for performing such matching.

Figure 4:
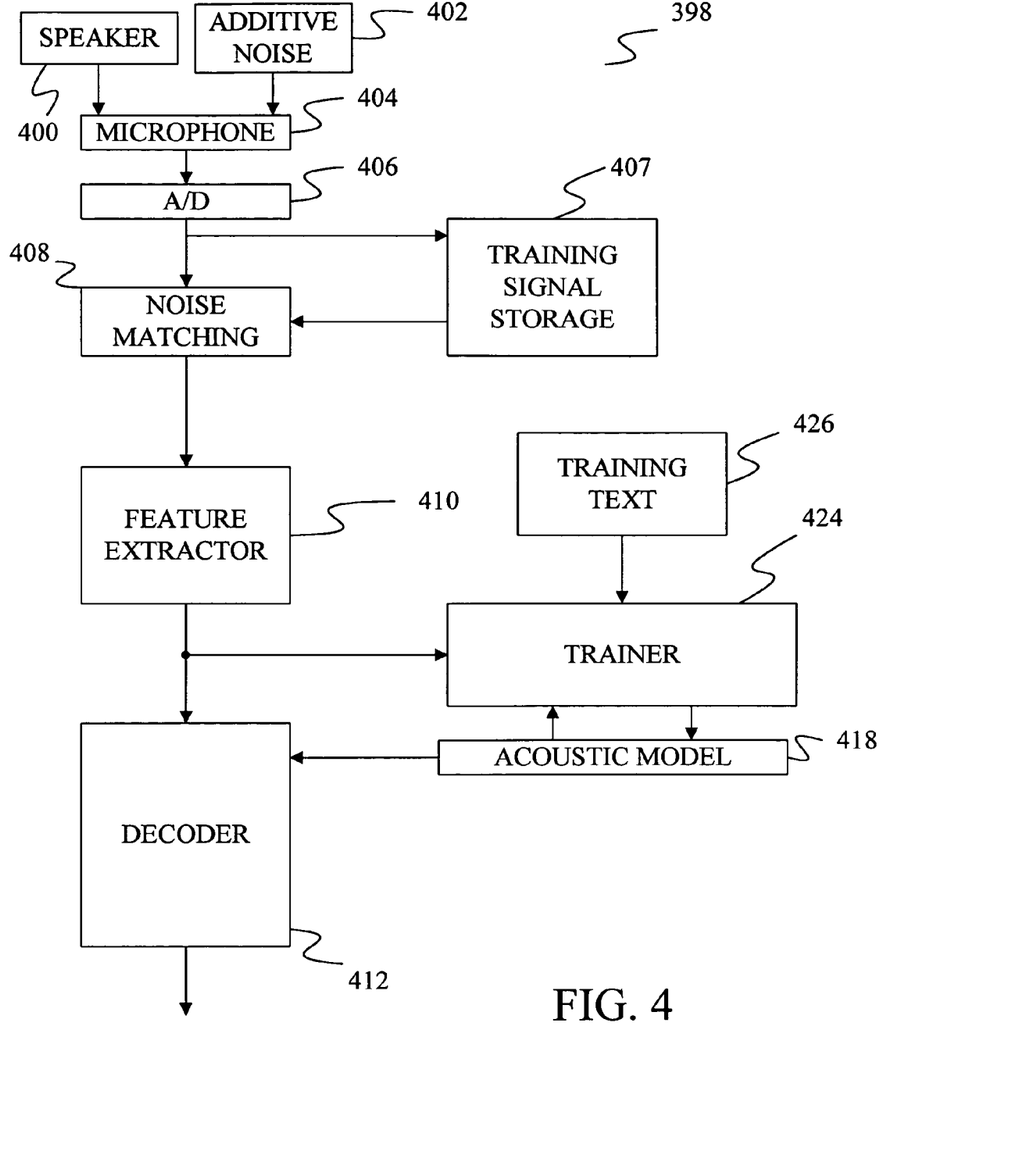
FIG. 4 is a more detailed block diagram of a speaker recognition system of one embodiment of the present invention.

In step 300 of FIG. 3, a speaker recognition system 398, shown in FIG. 4, receives and stores a training signal. The training signal is received through a microphone 404, which detects a speech signal produced by speaker 400 and additive noise 402. Typically, the training signal is generated by the speaker reading a short identification text such as "Log me in". Microphone 404 converts the acoustic signal produced by speaker 400 and additive noise 402 into an electrical analog signal that is provided to an analog-to-digital converter 406. Analog-to-digital converter 406 samples the analog signal to produce digital values that are stored in a training data storage 407. Although the training data is shown as being stored as time domain values, those skilled in the art will recognize that the training data may be stored in the frequency domain or as a collection of feature vectors.

At step 302 of FIG. 3, speaker recognition system 398 receives a test signal from speaker 400 along with different additive noise 402. This test signal is typically generated by repeating the identification phrase that was used to generate the training data. Like the training signal, the test signal passes through a microphone and an analog-to-digital converter. Although only one microphone 404 and analog-to-digital converter 406 are shown in FIG. 4, those skilled in the art will recognize that a different microphone and analog-to-digital converter can be used during testing than was used during training. The digital values produced by analog-to-digital converter 406 are then provided to a noise matching component 408, which also receives the training data that is stored in training data storage 407.

At step 304, noise matching component 408 identifies and stores the spectrum of selected samples found in training signal and the test signal. The elements for performing this identification are shown in more detail in FIG. 5.

Figure 5:
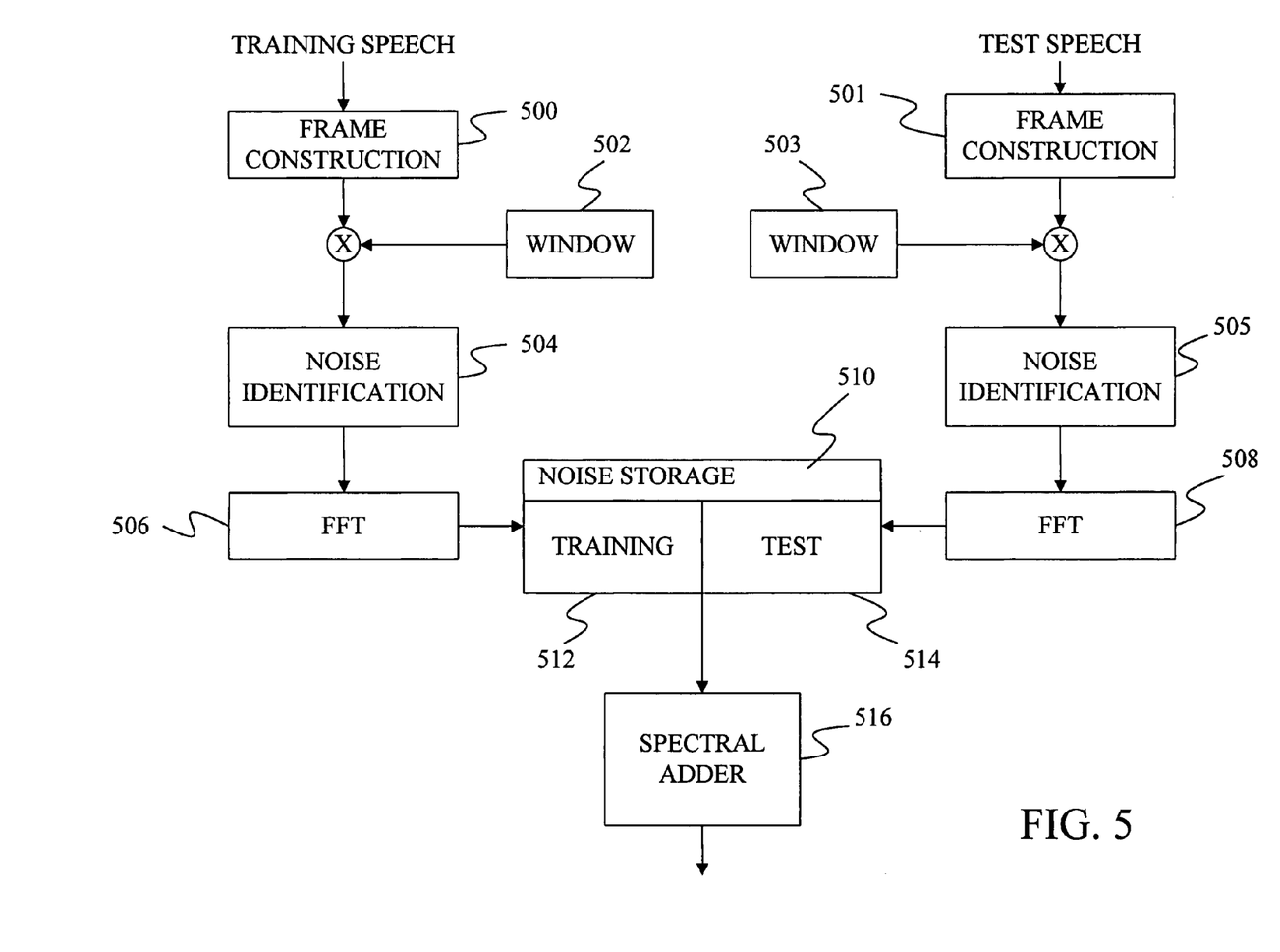
FIG. 5 is a more detailed block diagram of a noise matching component under one embodiment of the present invention.

In FIG. 5, the test data and training data are each provided to a respective frame construction unit 500, 501, which divide the respective signals into frames, each typically 25 milliseconds long and each starting 10 milliseconds after the start of the previous frame. Each frame is multiplied by a respective window 502, 503, which is typically a Hamming window or a Hanning window. The resulting windows of speech are provided to respective noise identification units 504 and 505.

Figure 6:
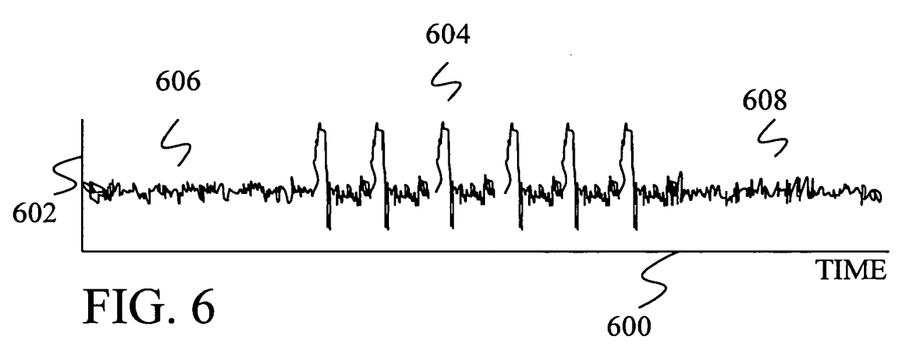
FIG. 6 is a graph of a speech signal.

Noise identification units 504 and 505 identify which frames contain only noise and which frames contain a combination of noise and speech. As can be seen in FIG. 6, a speech signal contains active speech regions and non-active speech regions. In FIG. 6, time is shown along horizontal axis 600 and the amplitude of the speech signal is shown along vertical axis 602. The speech signal of FIG. 6 includes one active region 604 that contains both noise and speech and two non-active regions 606 and 608 that contain only noise and represent periods where the speaker has paused.

Noise identification units 504 and 505 can use any of a number of known techniques to classify the frames as speech or noise. As is known in the art, these techniques can operate on the windowed speech signal directly or on transformations of the speech signal such as Fast Fourier Transform values or mel-cepstrum features.

When noise identification units 504 and 505 of FIG. 5 classify a frame as a noise frame, they pass the noise frame through a respective Fast Fourier Transform (FFT) 506, 508. Each FFT 506, 508 converts the values in the noise frame into a collection of frequency values representing the spectrum of the signal in the frame. These frequency values represent the relative strength of each frequency component in the spectrum of the signal and can be amplitude values or energy values. The FFTs produce complex numbers for the frequency values, energy is calculated as the square of the real value added to the square of the imaginary value. The amplitude is simply the square root of the energy. (Note that in the present application, and specifically in the claims, a reference to a strength value for a frequency component can be interpreted as either an amplitude value or an energy value.)

The strength values are stored in a noise storage 510. As is shown in FIG. 5, noise storage 510 is divided into two sections, a training storage 512, which contains noise frames from the training speech and a test storage 514, which contains noise frames from the test speech.

Once the spectrum of the noise frames for the training signal and test signal have been stored at step 304 of FIG. 3, the process of FIG. 3 continues at step 306. In step 306, the means and variances of a plurality of frequency components in the noise of the training signal and in the noise of the test signal are adjusted so that the means and variances are the same in the noise of both signals. This is performed by a spectral adder 516, which accesses the noise segments stored in noise storage 510. The technique for adjusting the means and variances of the noise is discussed further below in connection with FIG. 7.

Once the variances and the means of each frequency component of the noise have been matched, the matched training signal is output by spectral adder 516 to a feature extractor 410 of FIG. 4. Feature extractor 410 extracts one or more features from the training signal. Examples of possible feature extraction modules that can be used under the present invention include modules for performing linear predictive coding (LPC), LPC direct cepstrum, perceptive linear prediction (PLP), auditory model feature extraction, and Mel-frequency cepstrum coefficients feature extraction. Note that the invention is not limited to these feature extraction modules and that other modules may be used within the context of the present invention.

Using the features extracted by feature extractor 410, the method of FIG. 3 continues at step 310 by training a model based on the features extracted from the matched training signal. This training is performed by a trainer 424 of FIG. 4 based on the training identification phrase 426.

Using the extracted features and the training phrase, trainer 424 builds an acoustic model 418. In one embodiment, acoustic model 418 is a Hidden Markov Model (HMM). However, other models may be used under the present invention including segment models. Typically, feature vectors can be evaluated against the model, giving a probability that each feature vector was spoken by the same speaker who trained the model. Some models are dependent on what is spoken (so-called text-dependent), other types of models (text-independent) simply evaluate whether any sequence of sounds came from the same speaker who trained the model.

Once the acoustic model has been trained, spectral adder 516 provides the matched test signal to feature extractor 410 which extracts the same type of features from the matched test signal that were extracted from the matched training signal.

At step 312 of FIG. 3, the extracted features from the matched test signal are applied to acoustic model 418 by a decoder 412. Using acoustic model 418, decoder 412 determines an overall probability that the matched test signal was generated by the same speaker who trained acoustic model 418. This output probability can either be compared to other probabilities generated for other sets of training data or can be compared to a threshold value to determine whether the probability provided by decoder 412 is sufficiently high to identify the speaker as the same person who trained the current model.

Note that in the method of FIG. 3, the model is trained using matched training data that has had its noise matched to the noise in the matched test data. Also note that the matched test data is applied to the model. Under the present invention, such matching is thought to provide a more accurate probability measure for speaker identification.

Step 306 of FIG. 3, which shows the step of adjusting the variances and means of the noise in the training and test signals, represents a step of spectral addition that is performed in order to match the noise in the training signal to the noise in the test signal. Specifically, this step hopes to match the mean strength of each frequency in the noise of the test signal to the mean strength of each frequency in the noise of the training signal and to match the variance in the strength of each frequency component in the noise of these signals.

Under most embodiments of the present invention, the matching is performed by first identifying which signal's noise has the higher mean strength for each frequency component and which signal's noise has the higher variance for each frequency component. The test signal and the training signals are then modified by adding properly adjusted noise segments to each signal so that the mean and variance of each frequency component of the noise in the modified signals are equal to the maximum mean and maximum variance found in the noise of either signal. Under one embodiment, a cross-condition is applied so that the noise segments that are added to the test signal come from the training signal and the noise segments that are added to the training signal come from the test signal.

As an example, let us say that at frequency F1, the training noise has a mean of 5 and a variance of 2, the testing noise has a mean of 4 and a variance of 3. The following noise will be added to the training signal: test noise at frequency F1 modified such that when added to the training signal, the combined signal will have mean 5 (the greater of the two means) and variance 3 (the greater of the two variances). Thus, the signal to add will have mean 0 and variance 1, since the mean of summed signals is always additive, and the variance of summed linearly independent signals is additive (see Fundamentals of Applied Probability Theory, Alvin M. Drake, McGraw-Hill Book Company, 1988, p 108). In order to make the test noise segment have these characteristics, the noise segment is shifted and scaled as discussed further below.

Similarly, the noise segment added to the test signal will be a training noise segment that has been scaled and shifted to have a mean of 1 and a variance of zero. When added to the test signal, the noise segment will cause the modified test signal to have mean 5 and variance 3 just like the modified training signal. As will be shown below, this technique of always selecting the signal with the higher mean or higher variance as the signal to match to, eliminates the need for flooring that causes spectral subtraction to be less than ideal.

The means and variances of the noise may be adjusted independently by adding two different respective signals to both the test speech signal and training speech signal or at the same time by adding one respective signal to both the test speech signal and the training speech signal. In embodiments where two signals are used, the mean may be adjusted before the variance or after the variance. In addition, the means and variances do not have to both be adjusted, one may be adjusted without adjusting the other. In the discussion below, the embodiment in which two different signals are applied to both the test signal and the training signal is described. In this embodiment, signals to match the variances of the noise are first added to the speech signal and then signals to match the means of the noise are added to the speech signals.

Figure 7:
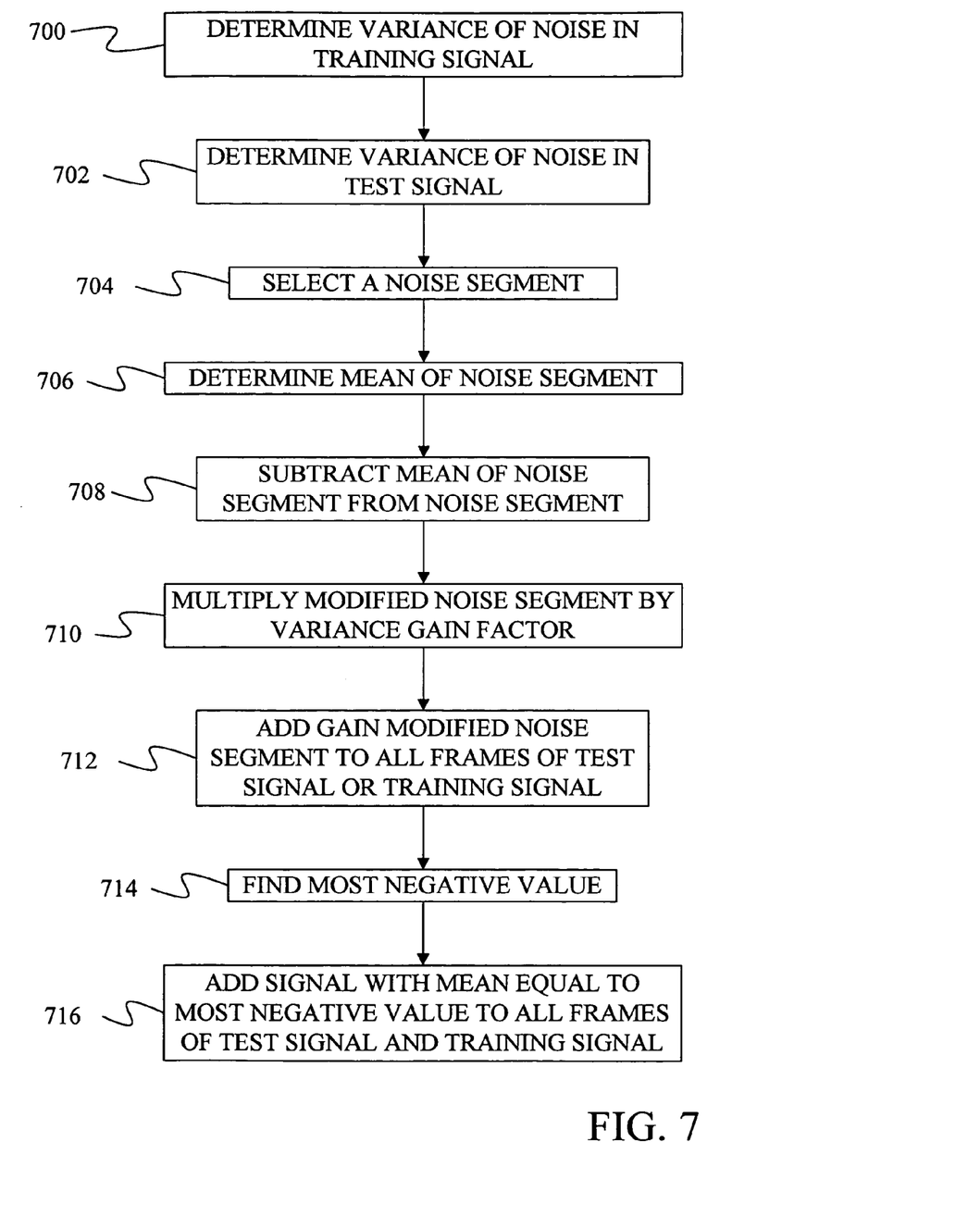
FIG. 7 is a flow diagram of a method of matching variances for a frequency component under one embodiment of the present invention.

The steps for adjusting the variance for a single frequency component of the noise are shown in FIG. 7. The method of FIG. 7 begins at step 700 where the variance of the noise in the training signal is determined. To determine the variance of a particular frequency component in the noise of the training signal, the method tracks strength values (i.e. amplitude values or energy values) of this frequency component in different noise segments stored in noise storage 510 of FIG. 5. Methods for determining the variance of such values are well known.

Figure 8:
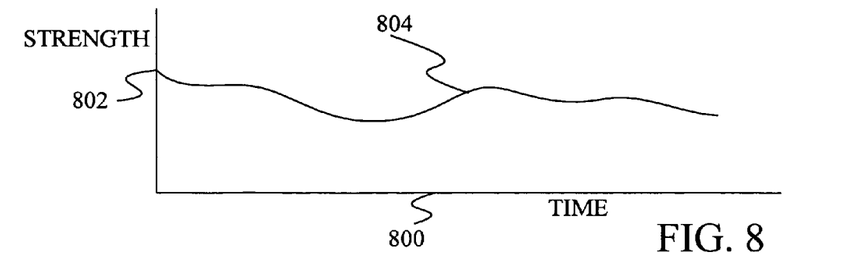
FIG. 8 is a graph of the strength of a frequency component as a function of time.

An example of how a frequency component's strength values change over time is shown graph 804 of FIG. 8 where time is shown along horizontal axis 800, and the strength of the frequency component is shown along vertical axis 802. Note that although graph 804 is depicted as a continuous graph, the strength values can be either discrete or continuous under the present invention.

To calculate the complete variance in the noise of the training signal, the strength of the frequency component is measured at each noise frame in the entire training corpus. For example, if the user repeated the identification phrase three times during training, the variance in the noise would be determined by looking at all of the noise frames found in the three repetitions of the training phrase.

After the variance of the frequency component in the noise of the training signal has been determined, the method of FIG. 7 continues at step 702 where the variance of the frequency component in the noise of the test signal is determined. The variance of the frequency component in the noise of the test signal is determined using the same techniques discussed above for the training signal.

Once the variances of the frequency component in the noise have been determined for the training signal and the test signal, the present invention determines which signal has the greater variance in the noise and then adds a noise segment to the other signal to increase the variance of the frequency component in the signal that has the lesser variance in the noise so that its variance in the noise matches the variance in the noise of the other signal. For example, if the variance of the frequency component in the noise of the training signal were less than the variance of the frequency component in the noise of the test signal, a modified noise segment from the test signal would be added to the training signal so that the variance in the noise in the training signal matches the variance in the noise in the test signal.

Under one embodiment, the noise segments are not added directly to the signals to change their variance. Instead the mean strength of the frequency component is set to zero across the noise segment and the variance of the noise segment is scaled. These changes limit the size of the strength values that are added to the test signal or training signal so that the variances in the noise in the test signal and training signal match but the mean strength in the two signals is not increased any more than is necessary. The process of selecting a noise segment, setting the mean of the noise segment's frequency component to zero, and scaling the variance of the noise segment's frequency component are shown as steps 704, 706, 708 and 710 in FIG. 7.

First, at step 704, a noise segment is selected from the testing signal to be added to the training signal and from the training signal to be added to the test signal. These noise segments typically include a plurality of frames of the training signal or testing signal and can be taken from noise storage 510 of FIG. 5. Specifically, the strength values for the current frequency component are retrieved.

Figure 9:
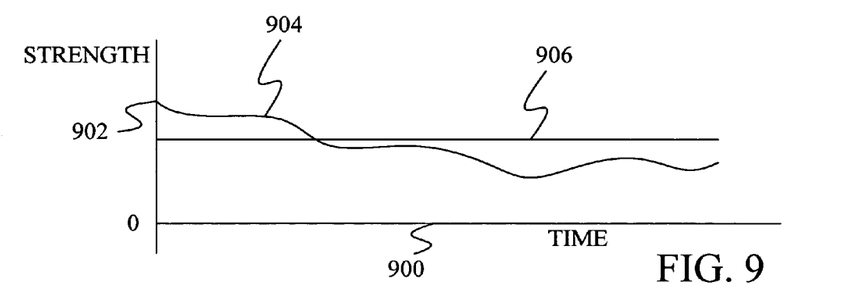
FIG. 9 is a graph of the strength of a frequency component as a function of time for a noise segment showing the mean of the strength.

An example of how the frequency component's strength for such a selected noise segment changes over time is shown as graph 904 in FIG. 9. In FIG. 9, time is shown along horizontal axis 900 and the strength of the frequency component is shown along vertical axis 902. Although graph 904 shows the frequency component as continuous, the frequency component may be continuous or discrete under the present invention.

After the noise segment has been selected, the mean of the strength of the frequency component in the noise segment is determined at step 706. In FIG. 9, the mean is shown as horizontal line 906.

Figure 10:
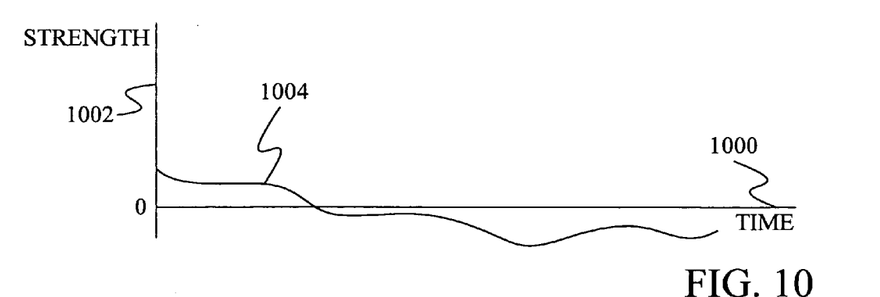
FIG. 10 is a graph of the strength of the frequency component of FIG. 9 after subtracting the mean.

In step 708 of FIG. 7, the mean determined in step 706 is subtracted from each of the strength values of the frequency component across the entire noise segment. For an embodiment where the strength values are continuous, this involves subtracting line 906 of FIG. 9 from graph 904 of FIG. 9. This subtraction results in a set of modified strength values for the frequency component of the noise segment. A graph 1004 of such modified strength values is shown in FIG. 10 where time is shown along horizontal axis 1000 and strength is shown along vertical axis 1002.

The mean strength of the frequency component in the noise segment is subtracted from the frequency component's strength values in order to generate a set of strength values that have zero mean but still maintain the variance found in the original noise segment. Thus, in FIG. 10, the strength of the frequency component continues to vary as it did in the original noise segment, however, its mean has now been adjusted to zero.

In step 710, once the values of the frequency component's strength have been adjusted so that they have zero mean, the values are scaled so that they provide a proper amount of variance. This scaling factor is produced by multiplying each of the strength values by a variance gain factor. The variance gain factor, G, is determined by the following equation:

$$G = \frac{|\sigma_{TRAIN}^2 - \sigma_{TEST}^2|}{\sigma_{NOISE}^2} \qquad \text{Eq. 1}$$

where G is the variance gain factor, $\sigma_{TRAIN}^2$ is the variance in the noise of the training signal, $\sigma_{TEST}^2$ is the variance in the noise of the test signal, and $\sigma_{NOISE}^2$ is the variance of the values in the zero-mean noise segment produced at step 708.

Figure 11:
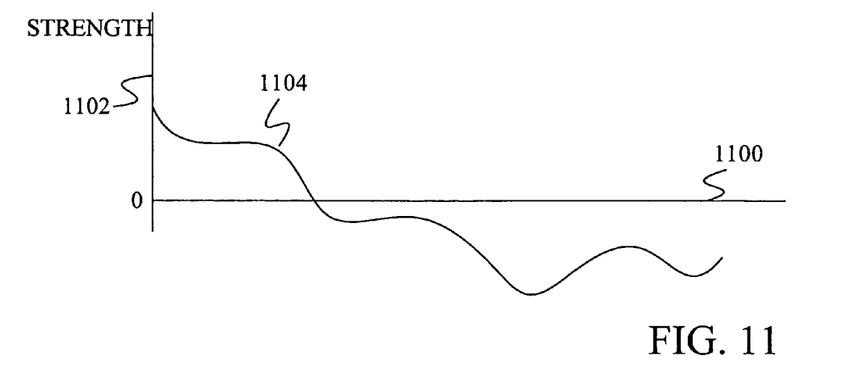
FIG. 11 is a graph of the strength of the frequency component of FIG. 10 after multiplying by a gain factor.

The result of multiplying strength values by the gain factor of equation 1 is shown in graph 1104 of FIG. 11 where time is shown along horizontal axis 1100 and strength is shown along vertical axis 1102. The frequency component values has the same general shape as graph 1004 of FIG. 10 but is simply magnified or compressed.

After step 710, the modified frequency component values of the noise segment have zero mean and a variance that is equal to the difference between the variance of the training signal and the variance of the test signal. Thus, the modified values can be thought of as a variance pattern. When added to the signal with the lesser variance in the noise, the strength values of this variance pattern cause the signal with the lesser variance in the noise to have a new variance in the noise that matches the variance in the noise of the signal with the larger variance in the noise. For example, if the test signal had a lower variance in its noise than the training signal, adding the variance pattern from the training noise segment to each of a set of equally sized segments in the test signal would generate a test signal with a variance due to noise that matches the higher variance in the noise of the training signal. The step of adding the variance pattern to the strength values of the test signal or training signal is shown as step 712.

Note that for the signal with the higher variance in the noise, the variance gain factor is set to zero. When multiplied by the strength values of the noise segment, this causes the modified noise segment to have a mean of zero and a variance of zero.

Figure 12:
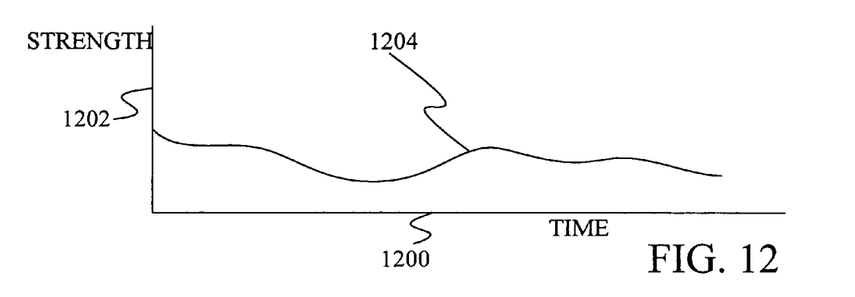
FIG. 12 is a graph of the strength of the frequency component for a segment of the test signal or training signal.
Figure 13:
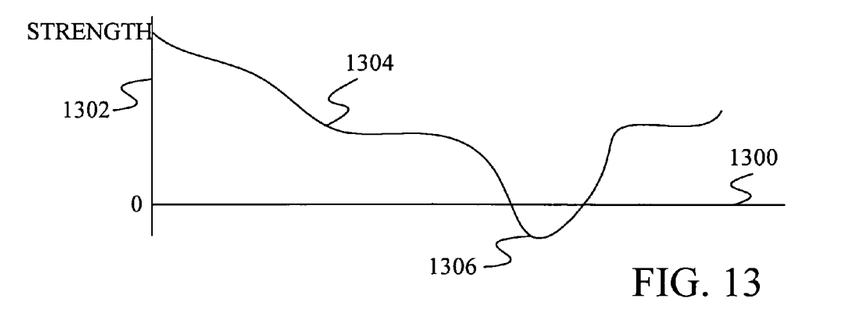
FIG. 13 is a graph of the segment of FIG. 12 after subtracting the variance pattern of FIG. 11.

Note that because of the subtraction performed in step 708, the test signal or training signal produced after step 712 may have a negative strength for one or more frequency components. For example, FIG. 12 shows strength values for the frequency component of either the test signal or training signal, with time shown along horizontal axis 1200 and strength shown along vertical axis 1202. Since the strength values in FIG. 12 are taken from an actual test signal or training signal, all of the strength values in graph 1204 are positive. However, FIG. 13 shows the result of the addition performed in step 712 where the strength values in segments of the test signal are added to respective strength values of the variance pattern shown in FIG. 11. In FIG. 13, time is shown along horizontal axis 1300 and strength is shown along vertical axis 1302. Graph 1304 of FIG. 13 represents the addition of graph 1104 of FIG. 11 with graph 1204 of FIG. 12. As shown in FIG. 13, graph 1304 includes negative values for some strengths of the frequency component because the variance pattern included some negative values after the mean of the noise segment was subtracted in step 708.

Since a negative strength (either amplitude or energy) for a frequency component cannot be realized in a real system, the strength values for the frequency component in the test signal and training signal must be increased so all of the values are greater than or equal to zero. In addition, the strength values must be increased uniformly so that the variance of the noise in the two signals is unaffected.

To do this, one embodiment of the present invention searches for the most negative value in the entire signal that had its variance increased. This minimum value is shown as minimum 1306 in FIG. 13. Once the minimum value has been identified, its absolute value is added to each of the strength values for the frequency component across the entire test signal and the entire training signal. This is shown as step 716 in FIG. 7.

Figure 14:
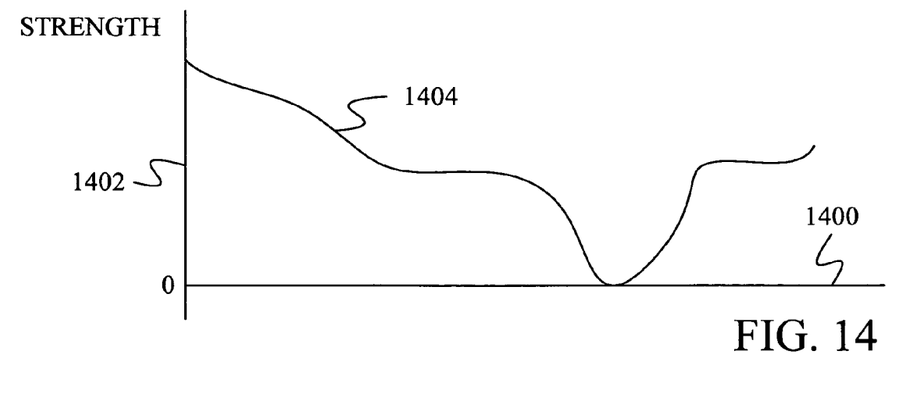
FIG. 14 is a graph of the segment of FIG. 13 after adding the absolute value of the most negative value to all values of the frequency component.

FIG. 14 provides a graph 1404 of the signal of FIG. 13 after this addition, showing that the strength for the frequency component now has a minimum of zero. In FIG. 14, time is shown along horizontal axis 1400 and strength is shown along vertical axis 1402. Since the strength value added to each of the strength values is the same, the variance of the noise in the test signal and training signal are unchanged.

Note that the strength value must be added to both the test signal and the training signal regardless of which signal had its variance increased. If this were not done, the mean of the noise in one of the signals would increase while the mean of the noise in the other signal would remain the same. This would cause the means of the noise to become mismatched.

In FIG. 7, the step of adjusting the modified test signal and training signal to avoid having negative values in those signals has been shown as occurring before the means of the noise of the two signals have been matched. In other embodiments, this step is performed after the means of the noise have matched. One benefit of waiting to adjust the signals for negative values until after the means of the noise have been matched is that the step of matching the means of the noise may cause the signals to be increased to the point where they do not include any negative values.

After step 716, the variances of the noise of the test signal and the training signal are matched and each signal only has positive strength values for each frequency component.

Note that the steps of FIG. 7 are repeated for each desired frequency component in the test signal and training signal. Also note that the variance of the noise for some frequency components will be higher in the test signal than in the training signal, while for other frequency components, the variance of the noise in the test signal will be lower than in the training signal. Thus, at some frequencies, a variance pattern formed from a noise segment will be added to the test signal, while at other frequencies, a variance pattern formed from a noise segment will be added to the training signal.

Figure 15:
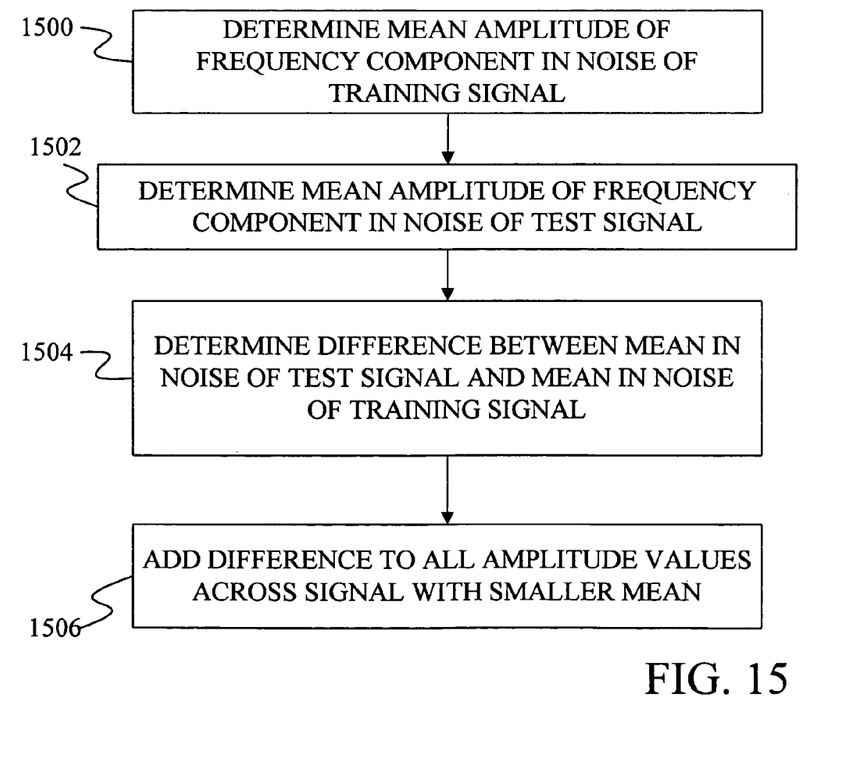
FIG. 15 is a flow diagram of a method of matching means under one embodiment of the present invention.

Once the variances in the noise of the training signal and test signal have been matched, the means of the strength values in the noise of the two signals are matched. This is shown as step 308 in FIG. 3 and is shown in detail in the flow diagram of FIG. 15. As in the method of FIG. 7, the steps for matching a mean strength of the noise shown in FIG. 15 are repeated for each frequency component of interest in the noise of the test signal and training signal. Consistent with the discussion above, the mean strength of the noise can either be the mean amplitude or the mean energy, depending on the particular embodiment.

In step 1500 of FIG. 15, the mean strength of the current frequency component in the noise of the training signal is determined. This mean can be calculated by accessing the strength values stored in noise storage 506 for the noise segments of the training signal. In step 1502, the mean strength for the current frequency component in the noise of the test signal is determined by accessing the strength values found in noise storage 508.

In step 1504 of FIG. 15, the difference between the means in the noise of the test signal and the training signal are determined. This involves simply subtracting the mean strength of the noise of one signal from the mean strength of the noise in the other signal and taking the absolute value of the result.

Figure 16:
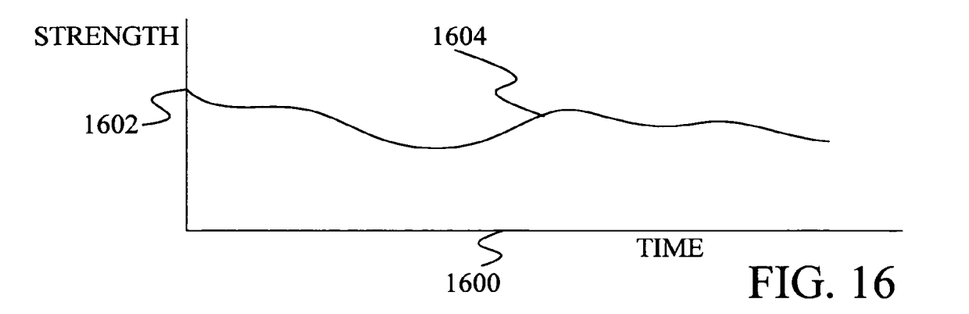
FIG. 16 is a graph of the strength of a frequency component of one of the test signal or training signal.
Figure 17:
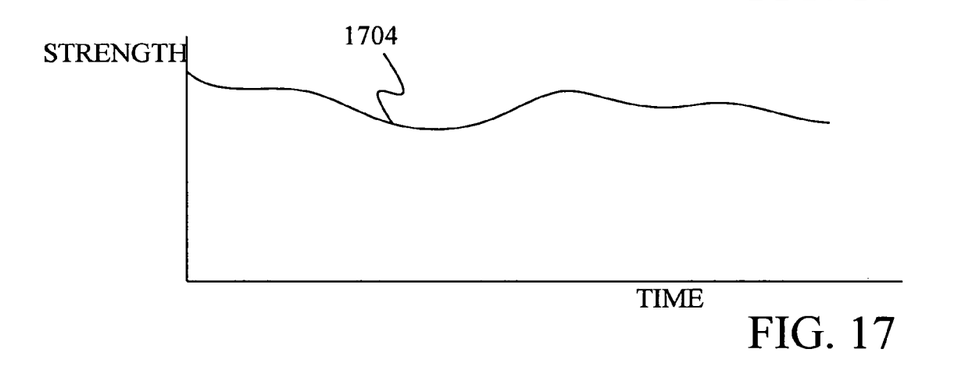
FIG. 17 shows the graph of FIG. 16 after adding the difference in means.

In step 1506, the signal with the lower mean in the noise has all of its strength values for the frequency component increased by an amount equal to the difference between the means of the noise in the test signal and the noise in the training signal. This can be seen by comparing FIGS. 16 and 17. In FIG. 16, graph 1604 shows the strength of a frequency component of the test signal or training signal as a function of time. In FIG. 16, time is shown along horizontal axis 1600 and strength is shown along vertical axis 1602. FIG. 17 shows the same frequency component for the same signal after the difference between the means in the noise of the test signal and training signal has been added to the signal of FIG. 16. Thus, graph 1704 of FIG. 17 has the same shape of graph 1604 of FIG. 16 but is simply shifted upward. This upward shift does not change the variance in the noise, but simply shifts the mean of the frequency component across the signal. Thus, the variances in the noise continue to be matched after the steps of FIG. 15.

Note that for some frequency components, the mean of the frequency component in the noise in the test signal is greater than the mean of the frequency component in the noise in the training signal while at other frequencies the reverse is true. Thus, at some frequencies, the difference between the means of the noise is added to the test signal while at other frequencies the difference between the means of the noise is added to the training signal.

As mentioned above, in alternative embodiments, only one respective noise signal is added to each of the training signal and test signal in order to match both the variance and means of the noise of those signals. Thus, one noise signal generated from a training noise segment would be added to the test signal and one noise signal generated from a test noise segment would be added to the training signal. Under one embodiment, the one noise signal to be added to each speech signal is formed by adding the difference between the means of the noise to all of the values of the variance pattern of the signal with the lower mean in the noise. The resulting mean adjusted variance pattern is then added to its respective signal as described above.

From the above discussion it can be seen that after the steps of FIG. 7 and FIG. 15 have been performed for each frequency component in the test signal and training signal, the mean of each frequency component in the noise of the training and test signals is the same and the variance of the frequency component in the noise of each signal is the same. This means that the noise in the training data and test data are matched.

Multiple training signals can be dealt with in several ways. Two primary ways are discussed here. First, if all the training signals are considered to have been generated in the same noisy environment, they can be considered to be one training signal for the above description. If they might have come from separate noisy environments, such as would occur if they were recorded at separate times, the above description would simply be extended to multiple signals. The mean and variance of each frequency of the noise of all signals would be appropriately adjusted (through adding noise from the other conditions) to have the maximum mean and variance at each frequency in the noise of any of the multiple signals.

Although the present invention has been described with reference to particular embodiments, workers skilled in the art will recognize that changes may be made in form and detail without departing from the spirit and scope of the invention.

What is claimed is:

1. A method of speaker recognition that generates a likelihood that the same speaker generated a training signal and a test signal, the method comprising:
   determining a mean strength of each of a plurality of frequency components of noise in the training signal;
   determining a mean strength of each of the plurality of frequency component of noise in the test signal;
   for each frequency component, subtracting the mean strength of noise in the training signal from the mean strength of noise in the test signal to determine a value for each frequency component;
   generating a matched test signal and a matched training signal by performing a step for each of the plurality of frequency components, the step comprising adding the respective value to a strength of the frequency component in the test signal as part of generating the matched test signal so that a mean strength of the frequency component of noise in the matched test signal matches a mean strength of the frequency component of noise in the matched training signal;
   selectively adding to the strength of each frequency component in one of the training signal or test signal in further production of the matched training signal and the matched test signal such that the variance of the strength of each frequency component of noise in the matched training signal is equal to the variance of the strength of each respective frequency component of noise in the matched test signal;
   creating a model based on the matched training signal; and
   applying the matched test signal to the model to produce the likelihood that a same speaker generated the training signal and the test signal.

2. A method of identifying a speaker comprising:
   receiving a training speech signal;
   receiving a test speech signal;
   receiving a second training speech signal;
   for each of a plurality of frequency components increasing a variance of the frequency component in one of the training speech signal or test speech signal so that a variance of the frequency component of noise in a matched training speech signal matches a variance of the frequency component of noise in a matched test speech signal, wherein increasing the variance of a frequency component in one of the training speech signal or test speech signal comprises:
      identifying the variance in the noise in the test speech signal, the variance in the noise in the training speech signal and a variance in the noise in the second training speech signal;
      determining which of the test speech signal, the training speech signal and the second training speech signal has the largest variance in the noise; and
      increasing the variance of the frequency component in one of the training speech signal or test speech signal so that the variance of the frequency component of noise in a matched training speech signal and the variance of the frequency component of noise in a matched test speech signal match the largest variance in the noise;

generating a model from the matched training speech signal; and comparing the matched test speech signal to the model to identify the speaker.

3. A computer-readable medium having computer-executable instructions for performing speaker recognition, the instructions performing steps comprising:

receiving a training speech signal;

receiving a test speech signal;

determining a mean strength of a frequency component in noise in the training speech signal;

determining a mean strength of a frequency component in noise in the test speech signal;

determining the difference between the mean strength in noise in the training speech signal and the mean strength in noise in the test speech signal;

adding the difference to the strength of the frequency component in one of the training speech signal or test speech signal in the production of a matched training speech signal and a matched test speech signal such that the mean strength of the frequency component in noise in the matched training speech signal is the same as the mean strength of the frequency component in noise in the matched test speech signal;

selectively adding to the strength of the frequency component in one of the training speech signal or test speech signal in further production of the matched training speech signal and the matched test speech signal such that the variance of the strength of the frequency component of noise in the matched training speech signal is equal to the variance of the strength of the frequency component of noise in the matched test speech signal;

generating a model from the matched training speech signal; and comparing the matched test speech signal to the model to identify a speaker.

4. The computer-readable medium of claim 3 wherein selectively adding to the strength of the frequency component comprises:

selecting a noise segment from one of the training speech signal or the test speech signal;

identifying strength values of the frequency component in the noise segment;

determining the mean of the strength values;

subtracting the mean of the strength values from the strength values to produce a sequence of mean adjusted strength values;

multiplying the mean adjusted strength values by a gain factor to produce gain adjusted strength values;

adding the gain adjusted strength values to respective strength values of the frequency component in each of a plurality of segments that together constitute one of the training speech signal or test speech signal.

5. The computer-readable medium of claim 4 wherein adding to the strength of at least one frequency component of one of the training speech signal or test speech signal comprises adding the same value to all of the gain adjusted strength values before adding the gain adjusted strength values to the respective strength values.

6. The computer-readable medium of claim 5 wherein selectively adding to the strength of the frequency component further comprises:

identifying the most negative value produced by adding the gain adjusted strength values to the respective strength values of the frequency component in each of a plurality of segments that constitute one of the training speech signal and test speech signal; and adding a value equal to the absolute magnitude of the most negative value to each strength value of the frequency component in both the training speech signal and the test speech signal.

7. The computer-readable medium of claim 4 wherein the computer-executable instructions perform further steps comprising:

determining a variance of strength values of the frequency component in the noise in the test speech signal;

determining a variance of strength values of the frequency component in the noise in the training speech signal;

determining a variance of the strength values of the frequency component in the noise segment; and determining the gain factor by subtracting the variance in the noise in the test speech signal from the variance in the noise in the training speech signal and dividing the difference by the variance in the noise segment.

8. The computer-readable medium of claim 4 wherein selectively adding to the strength of the frequency component further comprises:

identifying the most negative value produced by adding the gain adjusted strength values to the respective strength values of the frequency component in each of a plurality of segments that constitute one of the training speech signal and test speech signal; and adding a value equal to the absolute magnitude of the most negative value to each strength value of the frequency component in both the training speech signal and the test speech signal.

9. An apparatus for recognizing a speaker based on a test signal and a training signal, the apparatus comprising:

means for determining a mean strength of a frequency component of noise in the training signal;

means for determining a variance of the strength of the frequency component of noise in the training signal;

means for determining a mean strength of the frequency component of noise in the test signal;

means for determining a variance of the strength of the frequency component of noise in the test signal;

means for determining a difference between the mean strength of the frequency component of noise in the training signal and a mean strength of the frequency component of noise in the test signal;

a spectral addition component for adding the difference to a strength of the frequency component in at least one of the test signal or training signal to produce a matched test signal and a matched training signal such that a mean of the strength of the frequency component in noise in the matched training signal is equal to a mean of the strength of the frequency component in noise in the matched test signal and selectively adding to the strength of the frequency component in one of the training signal or test signal in further production of the matched training signal and matched test signal such that the variance of the strength of the frequency component of noise in the matched training signal is equal to the variance of the strength of the frequency component of noise in the matched test signal;

a trainer for training a speaker recognition model based on the matched training signal; and a decoder capable of generating a probability for an identity of a speaker based on the model and the matched test signal.

* * * * *